United States Patent Office 2,988,171
Patented June 13, 1961

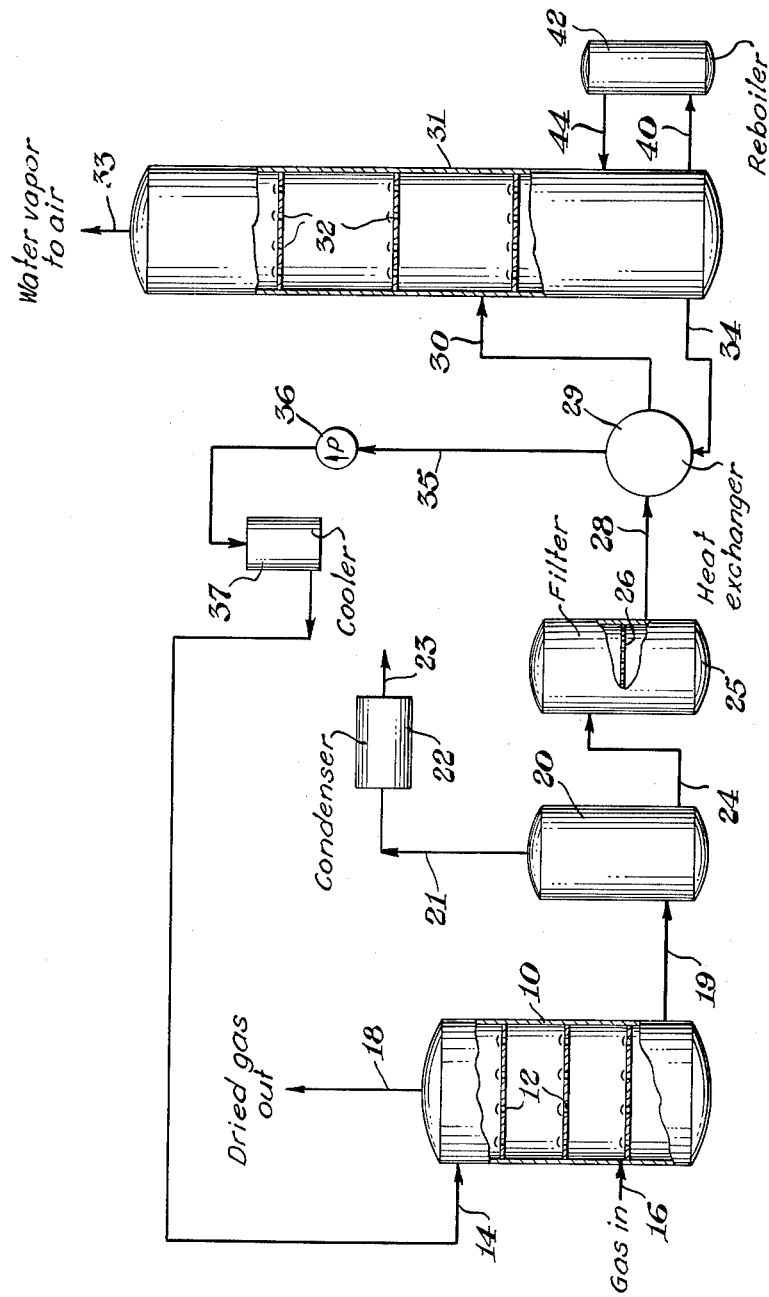

2,988,171
SALT-ALKYLENE GLYCOL DEW POINT DEPRESSANT
John L. Arnold, Kawkawlin, and Benjamin G. Hofmeyer, Bay City, Mich., assignors to The Dow Chemical Company, Midland, Mich., a corporation of Delaware
Filed Jan. 29, 1959, Ser. No. 789,967
3 Claims. (Cl. 183—121)

The invention is concerned with the removal of moisture from gases as shown by the dew point depression of gases treated according to the invention.

Gases frequently contain moisture. The presence of moisture is usually objectionable. It is, therefore, desirable that the moisture therein be substantially removed. Illustrative of gases containing moisture are natural gas and synthetic gas commonly called illuminating gas employed largely for heat, light, and power. Natural gas, and especially casing-head gas, often contain high percentages of moisture. It is highly desirable that a substantial portion of this moisture be removed not only prior to use but prior to transportation through pipe lines. The water is not only troublesome during combustion and while being transported during freezing weather, but it is often troublesome while being transported at temperatures well above the freezing point of water due to the formation of gas hydrate, a crystalline mass composed of one or more hydrocarbons hydrated with water. The molar ratio of hydrocarbon to water in the hydrate may be on the order of only one mole of a hydrocarbon to from 1 to 6 or 7 moles of water or higher. These hydrates impede the free passage of the gas along transfer lines and particularly through constrictions, at junctions, and at rises and dips in lines. Usually the first hydrate formation is relatively small but it acts as a seed for further accumulation which grows into such a block in the lines that free passage of the gas therethrough is seriously impeded and often ultimately stopped.

A known method of removing moisture from gas, e.g., illuminating gas, entails contacting the gas requiring the moisture to be removed therefrom with an alkylene glycol, as by passing the gas, preferably upwardly, through cascading glycol, e.g., monoethylene glycol or a low-molecular weight polyethylene glycol, whereby a substantial portion of the moisture in the gas is removed. The glycol is usually thereafter regenerated or revivified by heating it in a rectifier or reflux column where a substantial portion of the moisture acquired from the gas is driven from the glycol which may then be recycled back and used for further moisture removal by passing the gas therethrough.

The effectiveness of a gas-dehydrating agent or method, e.g., the glycol treatment, is readily measured by the extent to which the dew point of a treating gas is lowered or depressed during treatment.

The moisture content of gases, accordingly, is usually determined in actual practice, for example in the industrial use of illuminating gas, by reading the dew points by means of a convenient instrument designed for that purpose such as that employed by the United States Bureau of Mines. The efficacy of a substance (often called a dew point depressant) employed to remove moisture from a gas is readily ascertained by reading the dew point, as above stated, as shown on the instrument before and after treatment. The decrease in dew point by treatment is readily convertible to the moisture content of the gas by reference to conversion tables in handbooks prepared for use in the gas industry.

The extent of removal of moisture from gases by passage thereof through known dew point depressants, e.g., a glycol, has been insufficient to render the gases thus treated suitable for a number of uses. Even where the gas containing an appreciable percentage of moisture can be used, in nearly all instances the lower the moisture content, the more efficient and appropriate is the gas for the purpose intended.

Therefore, a need exists for a more effective dew point depressant and a method of lowering or depressing the dew point of gases generally and of illuminating gases particularly.

We have discovered that a gas containing moisture can have the moisture content thereof markedly reduced by contacting the gas with a solution consisting essentially of a glycol containing a salt which is soluble therein and which is unreactive under the conditions of treatment, either with the glycol or with any constituent of the gas being treated. The reduction of moisture content of the gas thus attained is definitely superior to the reduction in moisture content effected by contacting the gas with glycol alone.

The invention, therefore, consists of a method of lowering the dew point of moisture-laden gases employing a composition of a glycol and a salt soluble therein. The preferred embodiment of the invention includes a regenerative step for removing from the glycol solution a substantial portion of the moisture acquired from the gas being treated.

The marked reduction in moisture content of the gases treated according to the invention is due to the synergistic effect of the salt-glycol solution. The effectiveness of the invention appears to be due to the reduced vapor pressure of the glycol-salt solution (which is acquiring water from the gas passing therethrough) in the contacting tower or chamber. The reduced vapor pressure results in a lower water vapor content in the vapor phase comprising the atmosphere in the zone above the glycol salt solution and as a result thereof, an effluent gas passing through such zone will pick up less moisture therefrom and will therefore have a lower final moisture content than gases subjected to other hygroscopic liquid now known.

Any salt soluble to the extent of about 1 percent by weight in the glycol at the temperature employed in the treatment may be used. The salt must not be employed in an amount sufficiently great to form a precipitate or crystalline reaction product with the glycol. The solubility of common salts in glycols may be ascertained from handbooks on the subject, e.g., Glycols by G. O. Curme. Illustrative of solubility values, at 77° F. in 100 grams of ethylene glycol, taken from that publication, are the following:

|  | Grams |
|---|---|
| $CaCl_2$ | 20.6 |
| LiBr | 39.4 |
| LiCl | 14.3 |
| $SrCl_2$ | 36.4 |

The salt employed may be one which is soluble in a substantially pure glycol or one which is soluble in the presence of small amounts of water, say up to 3 percent by weight of water. The salts are usually used as the hydrate since they are readily soluble in such state. For example, $MgCl_2$ is usually employed as the di-, tri-, tetra-, or hexahydrate, although the monohydrate is suitable and higher hydrates, if available, could be used. It is recommended that only the amount of the salt necessary to reduce the moisture content of the gas efficiently (as measured by the lowered dew point) be employed. If the glycol-salt solution is to be regenerated, that is, have the acquired moisture removed therefrom, as by refluxing, the salt should be employed in an amount which is not in excess of that necessary to saturate the glycol at the temperatures employed in the reflux tower.

The amount of the salt to employ is influenced, therefore, to some extent, by the solubility of the salt in the glycol used and the tendency, if any, for the salt to form a reaction product with the glycol at higher concentrations. Although the quantity of salt admixed with the glycol in the practice of the invention is not necessarily limited to that which will dissolve therein when the glycol-salt admixture is not to be regenerated, such amount of salt is undesirable and serves no useful purpose. When the admixture is to be regenerated, excess salt would be detrimental by settling out in the reboiler tubes and on the reflux baffle trays. As little as 1 percent has been found effective and as much as 20 percent of certain salts by weight of the glycol may be employed but over 15 percent is not recommended. Generally the percent by weight of the salt employed is between 3 and 10 percent, e.g., about 5 percent of $MgCl_2$.

Salts which are preferred as additaments to the glycol in the practice of the invention are those which are readily soluble in the glycol, are non-corrosive, are stable at the temperature employed when the gas is passed therethrough, show little or no tendency to react with the glycol or gases present in the gas being treated, e.g., $CO_2$ or $H_2S$ present in natural gas, do not crystallize out at regeneration temperatures, and which appear to have the most pronounced depressive effect on the dew point of the gas passed through the glycol solution of the salt. $MgCl_2$, $SrCl_2$, and $LiBr$ are illustrative of salts which are suitable for the practice of the invention. Such salts as $NaCl$, which have limited solubility in the glycol at advanced temperatures, may be employed as an additive to the glycol to decrease the moisture content of the gas passed therethrough, but are not recommended because they tend to crystallize out at the temperatures necessarily employed in the regenerative step, that is, when the glycol is heated to drive off a substantial portion of the acquired water.

The salts generally are conveniently added as a hydrate. The hexahydrate of $MgCl_2$ and $SrCl_2$ are the most commonly available form of these salts and are usually employed as such. However, only one mole of water of hydration is necessary to render $MgCl_2$ or $SrCl_2$ readily soluble in the glycol. If the salt available is in the dry form, it is desirable in most instances to admix water therewith to prepare a concentrated aqueous solution or slurry. At least one part of water to 5 parts of the salt is the recommended minimum of water to employ with anhydrous $SrCl_2$ or $MgCl_2$. Some salts such as $LiBr$ may be admixed dry without any water added thereto. Although excess water added to the salts is not desirable, such excess water does not present a serious problem because the excess can be readily driven off by first passing the glycol containing the salt and the water through the refluxing column before employing it as the dehydrating agent.

The glycols usually employed are mono-, di-, and triethylene glycol and monopropylene glycol. Tetra- and pentaethylene glycol and dipropylene glycol may be employed. The higher glycols are not suitable because the salts are less soluble therein, are more likely to polymerize at the temperature of regeneration, have objectionably high viscosities, and the hygroscopicity of such higher glycols is lower.

Monoethylene glycol, usually referred to as merely ethylene glycol, is usually readily obtainable and is of lower cost than the higher molecular weight glycols. It requires a lower temperature for regeneration and permits a higher rate of flow of wet gas therethrough because of its higher hygroscopicity.

However, the amount of water which may be removed from a glycol by refluxing the water-glycol mixture is considerably greater for the higher molecular weight glycols than for ethylene glycol. For example, when refluxing a water-ethylene glycol mixture, about 80 percent of the water is removed; by refluxing a water-diethylene glycol mixture, about 96 percent of the water is removed; by refluxing a mixture of water and triethylene glycol, about 98.6 percent of the water is removed; and by refluxing a mixture of water and tetraethylene glycol, about 99 percent of the water can be removed. It can therefore be seen that where the final moisture content of the gas must be especially low, the higher glycols would be used since the percent of moisture in the gas after treatment is directly related to the moisture content in the refluxed or regenerated glycol feed. The choice of glycol is accordingly dependent in part upon such conditions as the moisture content of the gas before treatment, the moisture specification which the thus-treated gas must meet, and the type of equipment and extent to which water is to be removed from the glycol during the regeneration step.

FIGURE 1 of the drawing schematically shows an apparatus useful in the practice of the invention. The drawing shows contacting tower 10 provided with bubble trays 12 and glycol-salt inlet 14, wet gas inlet 16, dry gas outlet 18, and liquid effluent outlet 19 for more or less spent glycol-salt solution containing absorbed moisture removed from the gas during treatment.

Outlet 19 leads to tank 20 where any hydrocarbons picked up by the glycol-salt solution are largely flashed off through line 21, the heavier of which liquefy in condenser 22 and the lighter of which escape through vent 23.

The glycol-salt solution containing the absorbed moisture passes out of tank 20 through line 24 into filter tank 25 and thence downwardly through filter 26 therein. From 25 the spent glycol passes, via line 28, into heat exchanger 29 and thence through line 30 into reflux tower 31. Tower 31 is provided with perforated baffles 32, outlet 33 for water vapor driven from the glycol-salt solution during refluxing, and line 34 through which the substantially dehydrated glycol-salt solution is forced into heat exchanger 29 from whence it is forced upwardly through line 35 by means of pump 36, through cooler 37 into line 14 which returns it to tower 10.

Line 40 leads from the lower part of reflux tower 31 to reboiler 42 for the purpose of heating the glycol-salt-water solution; it is returned to 31 at a higher level through line 44.

To illustrate the higher percentage of water vapor remaining in a wet gas which has been passed through a glycol in accordance with known practice and that remaining in a similar gas passed through a glycol-salt solution in accordance with the invention, tests were made the details of which are set out in the following paragraphs and summarized in Table I.

For the purposes of comparison of the invention to known practice, a blank run was made as follows: A predetermined weight of water was dissolved in ethylene glycol to simulate spent glycol after a period of use as a dew point depressant. A measured quantity of dry nitrogen gas under pressure was passed through the glycol-water solution thus prepared and thence through a tared U-tube containing a known weight of dry calcium sulfate as a dessicant. The moisture content of the nitrogen gas after passing through the glycol was then calculated.

To illustrate the effectiveness of the invention, a salt was dissolved in ethylene glycol and predetermined weight of water dissolved therein.

A measured quantity of dry nitrogen gas was passed through the glycol-salt-water solution and thence into a tared U-tube containing $CaSO_4$ as a dessicant in a manner similar to that employed in the blank run above. The moisture removed from the wet nitrogen gas by passing it through the dessicant was determined in each instance.

The moisture content thus quantitatively measured was converted to dew point depression values expressed in degrees F. by reference to a dew point depression chart which list dew point values for various water contents of gases. Such charts are found in "Equilibrium Moisture Contents of Natural Gas" in Bulletin No. 8 published by the Institute of Gas Technology. The dew points were thus ascertained to show the correlation between moisture content and dew points and the convenience of first measuring the dew point and then converting those values to moisture content as is done in actual practice. The determinations above were made in a constant temperature and humidity atmosphere to prevent any variations in results due to variations in temperature and/or humidity. The percentage composition of the glycol-water solution and the glycol-salt-water solution employed in the tests is set out in Table I. The glycol containing salt to which moisture is directly added is fully analogous to such glycol or glycol-salt solutions containing like amounts of water acquired by passing a water-wet gas therethrough as would be done in actual practice.

*Table I*

| Test Number | Glycol Used in Percent | Water Added in Percent | Salt Added in Percent | Dew Point Depression in °F. |
|---|---|---|---|---|
| 1 | 94.1 ethylene glycol | 5.9 | None | 50.0 |
| 2 | 90.0 ethylene glycol | 5.9 | 4.10 $MgCl_2$ | 68.2 |
| 3 | 94.7 diethylene glycol | 5.3 | None | 45.0 |
| 4 | 90.0 diethylene glycol | 5.3 | 4.69 $MgCl_2$ | 56.2 |
| 5 | 89.4 diethylene glycol | 10.5 | None | 29.0 |
| 6 | 80.0 diethylene glycol | 10.6 | 9.38 $MgCl_2$ | 42.0 |
| 7 | 97.0 triethylene glycol | 3.0 | None | 52.0 |
| 8 | 94.15 triethylene glycol | 3.0 | 2.85 $MgCl_2$ | 65.8 |
| 9 | 86.6 triethylene glycol | 3.40 | 10.10 $MgCl_2$ | 89.5 |
| 10 | 91.65 triethylene glycol | 3.40 | 5.00 $SrCl_2$ | 83.5 |
| 11 | 94.1 polyethylene glycol | 5.9 | None | 45.0 |
| 12 | 90.0 polyethylene glycol | 5.9 | 4.10 $MgCl_2$ | 49.6 |

An evaluation of the results set out in Table I shows that a gas after having passed through an alkylene glycol solution containing moisture (whether added directly or acquired by use as a hygroscopic liquid in a manner similar to known practice) contains more moisture than gas passing through the same alkylene glycol containing substantially the same amount of water but in which a salt has been dissolved according to the invention.

To show that the glycol-salt solution, containing water which had been acquired by removal from a gas passing therethrough, as in the practice of the invention, may be regenerated by refluxing at a suitable temperature, the following tests were made: A solution consisting of 80 percent by weight diethylene glycol, 10.62 percent water, and 9.38 percent $MgCl_2$ was distilled at atmospheric pressure. The distillation was stopped when the temperature had risen to 360° F. The water content at that time had been reduced to 3.4 percent. No precipitation of salt crystals could be detected in the distillation unit.

To show the lack of adverse effect due to the presence of such gases as $CO_2$ and $H_2S$ in gases from which moisture is desired to be removed, the following tests were made:

(a) A solution consisting of 90 percent diethylene glycol, 5.31 percent water, and 4.69 percent $MgCl_2$ was saturated with $CO_2$ and allowed to stand for 24 hours at room temperature and thereafter for an additional three hours at 35° F. No precipitation or cloudiness could be detected.

(b) A solution of 80 percent diethylene glycol, 10.62 percent water, and 9.38 percent $MgCl_2$ was saturated with $H_2S$ gas and allowed to stand at room temperature and again for an additional three hours at 35° F. No precipitation could be detected.

The presence, therefore, of $CO_2$ or $H_2S$, the contaminating gases most commonly associated with natural gas, had no adverse effects upon the method of the invention.

Tests were conducted to ascertain any effect the salt in the glycol might have upon the corrosivity of the glycol. The corrosivity of a solution consisting of 90 percent triethylene glycol and 10 percent $MgCl_2$ was contrasted to the glycol alone at boiling temperatures. The corrosivity was slightly increased by the presence of the $MgCl_2$. It was found that the addition of corrosion inhibitor, now employed with alkylene glycols alone, are similarly effective when employed in salt-alkylene glycols according to the invention. 0.05 to 1.0 percent by weight is commonly used. Among such corrosion inhibitors are borax and Corexit 60.

Foam inhibitors commonly employed such as the silicone antifoamers may be advantageously employed in the practice of the invention.

The following example illustrates the practice of the invention in a large scale field operation wherein natural gas from a Texas producing field was dehydrated.

A Black, Sivalls, and Bryson commercial dehydration unit having a 110 gallon capacity comprising a "sorber," or gas-liquid contacting column, and reflux tower similar to that shown schematically in the attached drawing was in use at the field. The unit was using triethylene glycol as the dehydrating liquid. The through-put gas rate was 3.1 million cubic feet per day. Borax was used as a corrosion inhibitor. The reflux temperature was 350° F. The glycol losses, corrosion effects on mild steel strips exposed in the glycol vapor section of the "sorber" column, and the dew point of the gas treated had been determined over a period of 49 days prior to the instant example for the purposes of comparison.

To perform the example of the invention, the unit was shut down and cleaned and sufficient $MgCl_2 \cdot 6H_2O$ then added to triethylene glycol to give a weight ratio of 95 triethylene glycol 1:5 $MgCl_2$ solution. The reflux temperature was increased to 380° F. Natural gas at the same rate as that employed with the glycol alone was then passed through the unit. The glycol losses, corrosion effects, and dew points were then determined over a period of 7 days.

The results of the conventional use employing triethylene glycol alone and that according to the invention wherein 5 percent $MgCl_2$ in ethylene glycol was employed were as follows: (1) Corrosivity as shown by the mild steel strips exposed to the sorber column vapors was somewhat affected by the presence of the $MgCl_2$. An average corrosion calculated in mils per year were 3.18 in the conventional operation and 4.43 mils per year in the practice of the invention. This difference is not consirered seriously detrimental to the practice of the invention. Excessive temperatuures were found to aggravate the corrosivity. The moisture content of the glycol salt solution should not be reduced to less than about 1 percent by weight. Controlling the reflux temperature to maintain it substantially below the boiling point of the glycol is a safeguard against driving off all the water. (2) During the first day of use of the glycol-$MgCl_2$ composition, foaming was greater than had been experienced with glycol alone and 8 gallons of glycol were lost. Thereafter foaming was negligible. (3) The dew point depression obtained by the conventional operation was never greater than 62° F. and was as low as 50° F. In contrast thereto, the dew point depression attained in the practice of the invention, employing 5 percent $MgCl_2$ in the glycol, was 92° F. the first day, 82° F. the second day, and never fell below 68° F. in the succeeding days. (4) The triethylene glycol solution containing no salt according to known practice was 97 percent glycol and 3 percent water after regeneration. The composition of the dehydrating solution employed according to the invention was 91.7 percent of the glycol, 4.7 percent $MgCl_2$, and 3.6 percent water during the first days of the run when the reboiler temperature for regeneration of 385° F. was employed. The moisture content of the regenerated glycol-salt solution was thus comparable to the glycol above.

By raising the temperature of the reboiler to 400° F., the moisture content of the regenerated glycol-salt solution was reduced to 0.5 percent. This low water content shows the effectiveness of the regeneration step but it is not recommended due to some crystallization of $MgCl_2$ at this low percentage of water. Tests have shown that 4.5 percent $MgCl_2$ will remain in solution when only 1 percent water is present. However, it is recommended that at least 2 percent water be present in the glycol.

An examination of the results of the example in contrast to the conventional run set out above support the conclusion that the practice of the invention results in a definitely lower dew point in the gas treated thereby without serious detrimental effects. It shows that glycol-salt solution used in accordance with the invention may be regenerated effectively.

Having described the invention, what is claimed and desired to be protected by Letters Patent is:

1. The method of treating a gas containing moisture to reduce the moisture content thereof consisting of admixing an alkylene glycol selected from the class consisting of monoethylene, monopropylene, diethylene, dipropylene, triethylene, tetraethylene, and pentaethylene glycol and mixtures thereof, with an inorganic salt selected from the class consisting of $MgCl_2$ $SrCl_2$ and LiBr in an amount of at least 1 percent based on the weight of glycol but less than that necessary to produce saturation thereof, and passing the gas to be treated upwardly through said admixture.

2. The method of treating a gas containing moisture to reduce the moisture content thereof consisting of dissolving in an alkylene glycol selected from the class consisting of monoethylene, monopropylene, diethylene, dipropylene, triethylene, tetraethylene, pentatethylene glycol, and mixtures thereof, an inorganic salt selected from the class consisting of $MgCl_2$ hydrates, $SrCl_2$ hydrates, and LiBr, in an amount sufficient to provide at least 1 percent thereof, by weight of the glycol, but less than the amount necessary to produce saturation of the glycol, passing said gas through the glycol-salt solution thus made to remove moisture from the gas, passing the glycol salt solution containing moisture thus removed from said gas into a refluxing column maintained at a temperature above the boiling point of water and below the boiling point of the glycol, until a substantial portion of the water contained in the glycol-salt solution is volatilized therefrom, removing the thus dehydrated glyco-salt solution from said refluxing column, and passing additional gas from which the moisture is to be removed through the thus dewatered glycol-salt solution.

3. The method of claim 2 wherein the salt employed is magnesium chloride hydrate employed in an amount between 3 and 10 percent by weight of the glycol.

References Cited in the file of this patent

UNITED STATES PATENTS 1,866,560    Gordon et al.            July 12, 1932